US009779771B1

United States Patent
Wang et al.

(10) Patent No.: US 9,779,771 B1
(45) Date of Patent: Oct. 3, 2017

(54) CAPPING LAYER FOR MAGNETIC RECORDING STACK

(71) Applicant: Seagate Technology LLC, Cupertino, CA (US)

(72) Inventors: Kangkang Wang, Fremont, CA (US); Yingguo Peng, San Ramon, CA (US); Ganping Ju, Pleasanton, CA (US); Xiaobin Zhu, San Ramon, CA (US); Li Gao, San Jose, CA (US); Yinfeng Ding, Fremont, CA (US); Kai Chieh Chang, Pleasanton, CA (US); Timothy J. Klemmer, Union City, CA (US); Yukiko Kubota, Campbell, CA (US); Jan-Ulrich Thiele, Sunnyvale, CA (US); Thomas P. Nolan, Fremont, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/083,735

(22) Filed: Mar. 29, 2016

Related U.S. Application Data

(60) Provisional application No. 62/197,998, filed on Jul. 28, 2015.

(51) Int. Cl.
*G11B 5/65* (2006.01)
*G11B 5/72* (2006.01)
*G11B 5/00* (2006.01)
*G11B 5/66* (2006.01)

(52) U.S. Cl.
CPC ............... *G11B 5/653* (2013.01); *G11B 5/72* (2013.01); *G11B 5/66* (2013.01); *G11B 2005/0021* (2013.01)

(58) Field of Classification Search
None
See application file for complete search history.

(56) References Cited

U.S. PATENT DOCUMENTS

| 5,991,126 | A | 11/1999 | Hayashi et al. | |
|---|---|---|---|---|
| 7,782,566 | B2 | 8/2010 | Shiroishi | |
| 8,658,292 | B1 | 2/2014 | Mallary et al. | |
| 8,947,987 | B1* | 2/2015 | Wang | G11B 5/72 360/135 |
| 9,034,492 | B1* | 5/2015 | Mallary | G11B 5/64 427/127 |
| 9,121,886 | B2* | 9/2015 | Singleton | G01R 33/09 |
| 9,159,350 | B1* | 10/2015 | Wang | G11B 5/65 |
| 2007/0003792 | A1* | 1/2007 | Covington | G11B 5/1278 428/812 |
| 2007/0172705 | A1* | 7/2007 | Weller | G11B 5/66 428/827 |
| 2009/0040644 | A1* | 2/2009 | Lu | G11B 5/314 360/59 |

(Continued)

*Primary Examiner* — Kevin Bernatz
(74) *Attorney, Agent, or Firm* — Hollingsworth Davis, LLC

(57) ABSTRACT

A stack includes a substrate, a magnetic recording layer comprising FePtX disposed over the substrate, and a capping layer disposed on the magnetic recording layer. The capping layer comprises Co; at least one rare earth element; one or more elements selected from a group consisting of Fe and Pt; and an amorphizing agent comprising one to three elements selected from a group consisting of B, Zr, Ta, Cr, Nb, W, V, and Mo.

20 Claims, 7 Drawing Sheets

(56) References Cited

U.S. PATENT DOCUMENTS

| | | | |
|---|---|---|---|
| 2009/0226762 A1* | 9/2009 | Hellwig | G11B 5/66 428/815 |
| 2012/0140359 A1* | 6/2012 | Tachibana | G11B 5/7315 360/135 |
| 2012/0154948 A1* | 6/2012 | Tamai | G11B 5/65 360/75 |
| 2014/0272473 A1* | 9/2014 | Chen | G11B 5/716 428/839.6 |
| 2015/0138939 A1* | 5/2015 | Hellwig | G11B 5/66 369/13.41 |

* cited by examiner

CAPPING LAYER FOR MAGNETIC RECORDING STACK

RELATED APPLICATIONS

This application claims the benefit of Provisional Patent Application Ser. No. 62/197,998 filed on Jul. 28, 2015, to which priority is claimed pursuant to 35 U.S.C. §119(e) and which is hereby incorporated herein by reference in its entirety.

SUMMARY

Embodiments discussed herein involve a stack comprising a substrate, a magnetic recording layer comprising FePtX disposed over the substrate, and a capping layer disposed on the magnetic recording layer. The capping layer comprises Co; at least one rare earth element; one or more elements selected from a group consisting of Fe and Pt; and an amorphising agent comprising one to three elements selected from a group consisting of B, Zr, Ta, Cr, Nb, W, V, and Mo.

Some embodiments discussed herein involve a stack comprising a substrate, a magnetic recording layer comprising FePtX disposed over the substrate and having a Curie temperature, and a capping layer disposed on the magnetic recording layer. The capping layer comprises Co, at least one amorphising agent, at least one rare earth element, and one or more elements selected from a group consisting of Fe and Pt, wherein the capping layer has a Curie temperature at least 50K greater than the Curie temperature of the magnetic recording layer.

Further embodiments discussed herein involve a stack comprising a substrate, a magnetic recording layer comprising FePtX disposed over the substrate, and a capping layer having a damping parameter greater than 0.05 disposed on the magnetic recording layer. The capping layer comprises Co, an amorphising agent, at least one rare earth element, and one or more elements selected from a group consisting of Fe and Pt.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

Figure 1:
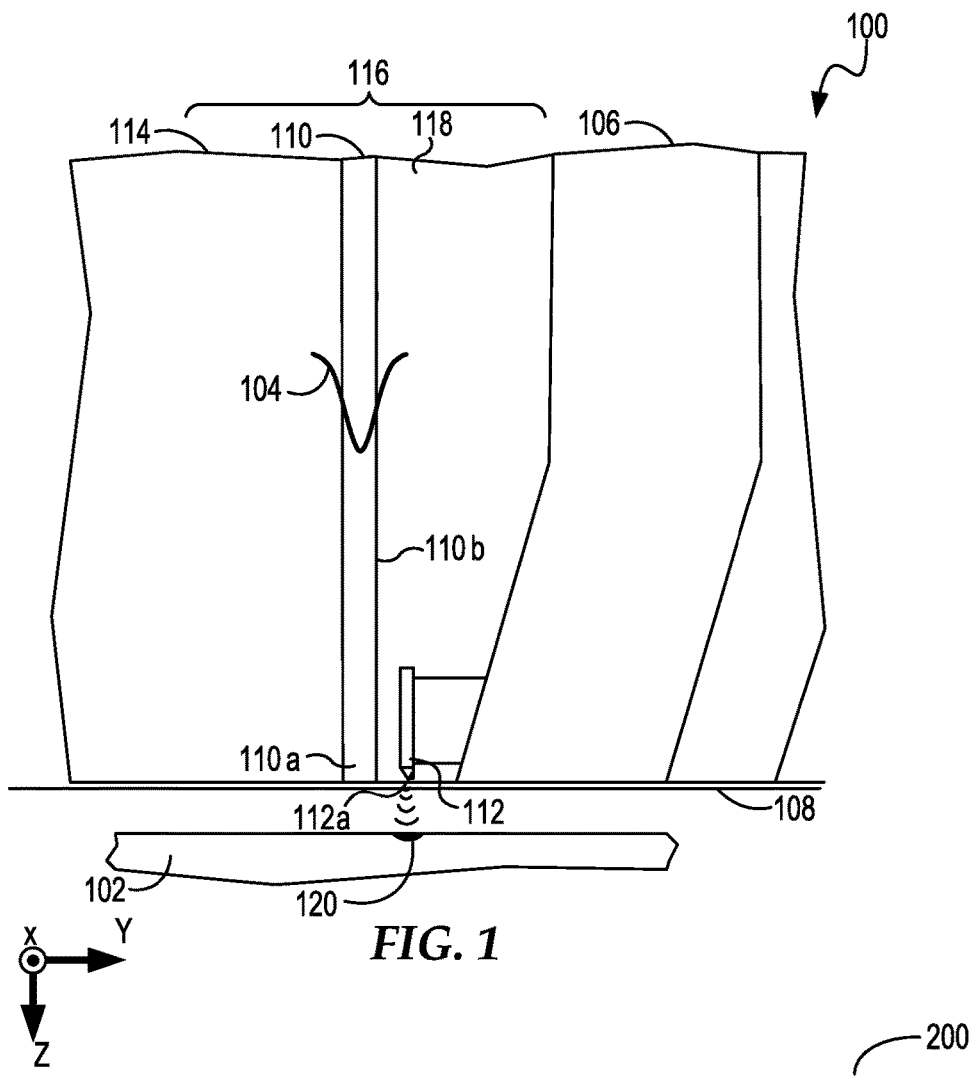
FIG. 1 is a cross-sectional view of a HAMR system in accordance with embodiments discussed herein.

Heat assisted magnetic recording (HAMR) is a technology that enables storage density in hard disk drives well beyond 1 Tb/in$^2$. The recording process starts by heating a small region of the disk above Curie temperature ($T_c$) using a near field transducer. The region is subsequently cooled rapidly in the presence of a magnetic field from the recording head. The magnetic field maintains the orientation of magnetization in the local region of heated media as it cools, thereby encoding a bit with data for storage. By reducing the local media anisotropy (K) at high temperature (e.g., above $T_c$), HAMR makes it possible to record data on high anisotropy material such as L10-FePt. The high anisotropy in L10-Fe:Pt extends the superparamagnetic limit faced with conventional magnetic recording, so that grain size can be further reduced to increase signal-to-noise ratio. However, the high anisotropy FePtX of HAMR media requires high temperature processing (e.g., above $T_c$) that presents a challenge to production of media with similar, or lower, roughness as compared to current, conventional perpendicular media.

From the perspective of designing recording media, HAMR presents various challenges. Among them is how to reduce media roughness while improving recording performance. This is complicated due to multiple parameters affecting HAMR media that are controlled, or optimized, at the same time. Such parameters include: media structure, the fabrication process to reduce media roughness, switching dynamics at Curie temperature ($T_c$), the freezing process of stored data for minimizing DC noise, thermal design to achieve high thermal gradients, etc.

Embodiments described herein are directed to HAMR continuous-granular media with controlled thermal and damping properties. A damping controlled amorphous cap layer with a Curie temperature higher than that of FePt reduces media roughness and improves media recording performance at the same time for HAMR media. An amorphous FeCoX, FeCoPtX, CoPtX, or CoX, where X is a placeholder for additional elements, layer offers a smooth surface and low thermal conductivity which improves media surface smoothness without causing lateral thermal broadening. Increased damping and higher $T_c$ in the cap layer further suppresses DC noise by reducing precession in the cap layer and providing finite magnetic moment during the HAMR freezing process, which refers to cooling of the media to set, or freeze, the magnetic orientation of the bit. Embodiments discussed herein offer benefits from mechanical, thermal, magnetic, and recording performance perspectives.

In some embodiments, a composite media structure addresses the above requirements using a damping controlled amorphous cap layer with higher $T_c$ than the main magnetic storage layer. The main storage layer typically comprises a single layer, or multiple layers, of FePtX:oxide/carbide/nitride (or in combination with carbon). FePt, when used for a recording layer in HAMR media, has a Curie temperature of at least 650K, and typically has a Curie temperature between 650K and 750K, depending on ordering and doping. The cap layer comprises Co, one or more of Fe and Pt, and an amorphising agent comprising one or more of B, Zr, Ta, Cr, Nb, W, V, and Mo. The amorphising agent is the means by which amorphous character is imparted in the capping layer, and no more than about 10-25% of the capping layer comprises amorphising materials. In certain embodiments, Cr increases Ms of the layer to greater than 600 emu/cc, and Pt can increase the Curie temperature and increase coupling with the recording layer. The amorphous cap layer can also include rare earth doping material comprising one or more of: Ho, Tb, Gd, Nd, Sm, Dy, Pr, Er, and Tm. The rare earth materials comprise about 1-5% of the capping layer to increase the damping parameter of the capping layer without decreasing the Ms. Examples of amorphous cap layer materials to be combined with the rare earth doping include FeCoXYZ, FeCoPtXY, and CoPtXYZ, where X, Y, and Z represent one or more elements of the amorphising agent.

A damping controlled amorphous cap layer, as described in various embodiments herein, provides reduced media roughness, lower recording temperature, lower laser power, lower DC noise, little to no degradation on the thermal gradient, and little to no degradation on the switching speed and switching temperature distribution as compared with media without such a capping layer. For example, an amorphous CoX based cap layer (where CoX is a generic description of a capping layer comprising Co, one or more of Fe and Pt, rare earth doping, and an amorphising agent comprising one or more of B, Zr, Ta, Cr, Nb, W, V, and Mo) is smoother than a main recording layer grown at high temperature. Therefore a capping layer as described herein, reduces the total roughness of the full HAMR media stack. In certain embodiments, an amorphous CoX based cap layer has a lower magnetic anisotropy than that of the L10-FePt based recording layer. A composite structure having multiple recording layers with a low-anisotropy cap layer starts to switch at a lower temperature than a structure having a single recording layer, Because of the lower recording temperature, lower laser power is needed to switch the composite stack. Furthermore, an amorphous CoX based cap layer has a high laser absorption coefficient which could further lower the laser power, Higher $T_c$ of the amorphous cap layer facilitates the media in maintaining certain magnetization to increase the Zeeman splitting (MsV*H) to reduce DC noise. High damping also lowers the DC noise due to suppressed spin precession. In certain embodiments, an amorphous CoX based cap layer has relatively low thermal conductivity (1-4 W/(m*K); therefore, the layer will not deteriorate the thermal gradient for full media stacks. This is not the case with crystalline cap layers where the thermal conductivity (20-30 W/(m*K)) causes lateral thermal bloom, resulting in a poorer thermal gradient. Also, rare-earth doping in the amorphous cap layer suppresses the precession in the cap layer and increases the switching speed of the cap layer, thereby improving the switching probability of full stack structures. High damping also lowers the DC noise and maintains sharp temperature dependence of the switching probability due to suppressed spin precession. Certain of the above-described parameters result from the HAIR recording system.

Turning to FIG. 1, a HAMR system is shown in cross-section where laser light is focused on a hot spot 120 on recording media 102, according to an example embodiment. The system includes a write head 100, a laser (not shown), and a HAMR recording medium 102. In this view, a near-field transducer 112 is shown proximate to a surface of magnetic recording medium 102, e.g., a magnetic disk. The waveguide system 116 delivers electromagnetic energy 104 (e.g., laser light) to the near-field transducer 112, which directs the energy 104 to create a small hotspot 120 on the recording medium 102. A magnetic write pole 106 causes changes in magnetic flux near the media-facing surface 108 in response to an applied current. Flux from the write pole 106 changes a magnetic orientation of the hotspot 120 as it moves past the write pole 106. The slider body, including the write head 100, moves over the recording medium 102 in a cross-track direction (y-direction).

The waveguide system 116 includes a core layer 110 surrounded by cladding layers 114, 118. The core layer 110 and cladding layers 114, 118 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, SiC, GaP, Si, etc. Generally, the dielectric materials are selected so that the refractive index of the core layer 110 is higher than refractive indices of the cladding layers 114, 118. This arrangement of materials facilitates efficient propagation of light through the waveguide system 116.

A first end of the core 110 (not shown) extends along the light propagation direction (z-direction) where it is directly or indirectly coupled to a light/energy source (e.g, a laser diode). For example, a laser diode may have an output facet that is coupled face-to-face with an end of the waveguide core 110. In other configurations, optical components such as lenses, mirrors, collimators, mode converters, etc., may be coupled between the waveguide core 110 and the light/energy source. In either case, the energy coupled into the first end of the waveguide core 110 propagates to a second end 110a that is proximate the near-field transducer 112. In this configuration, the near-field transducer 112 is located on a first side 110b of the waveguide core 110. The near-field transducer 112 then generates hot spot 120 on HAMR media 102.

Figure 2:
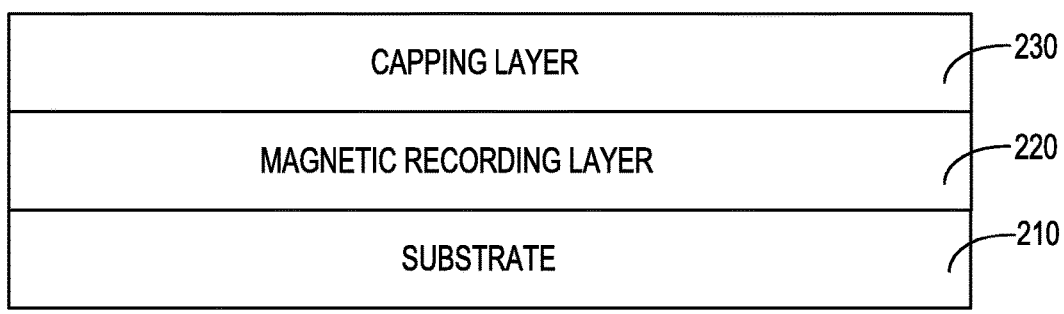
FIG. 2 is a cross-sectional diagram of a magnetic stack in accordance with embodiments discussed herein.

In FIG. 2, a cross-section of a HAMR media structure is shown as stack 200. The stack 200 includes a substrate 210, a magnetic recording layer 220, and a capping layer 230. The magnetic recording layer 220 comprises FePtX, where X is a placeholder for additional elements such as nonmagnetic segregant. The FePtX recording layer has a Curie temperature of at least 650K. The capping layer 230 comprises Co, one or more of Fe and Pt, at least one rare earth element, and a combination of one or more of B, Zr, Ta, Cr, Nb, W, V, and Mo. These combinations of elements provide desirable material, magnetic, and thermal properties such as amorphous or nanocrystalline structure with high $T_c$ (e.g., a Curie temperature greater than the $T_c$ of the main recording layer), and low thermal conductivity (e.g., less than or equal to 5 W/(K*m)). The stack 200 is further discussed below.

In various embodiments, a HAMR media structure, or stack, includes an amorphous cap layer comprises a rare earth doped Co alloy including one or more of Fe and Pt, and an amorphising agent disposed on granular FePtX HAMR media to suppress DC noise, reduce roughness, and improve recording performance. In certain embodiments, the amorphous cap layer material satisfies the following parameters: (1) smooth (e.g., Ra less than 0.4 nm); (2) low thermal conductivity less than 10 W/m*K); (3) a Curie Temperature higher than the FePtX granular storage layer (e.g., $T_c$(capping layer)≥$T_c$(granular layer)+50K); and (4) rare-earth doping to enhance damping to a damping parameter value of greater than 0.1.

The Curie temperature of the capping layer depends sensitively on both the atom composition and crystalline structure of the layer. Thus, a layer having the same atom composition would not necessarily have the same Curie temperature. It is possible for the Curie temperature of a capping layer to deviate from a desirable range due to varying composition ratios (e.g., Co:Pt ratio) and/or by adding dopants to the layer. For example, CoPt can have a Curie temperature up to 1100K, while $CoPt_3$ can have a Curie temperature of 290K. Also, preparing composite materials through different temperatures can result in different final compositions which will have different Curie temperatures.

A damping coefficient or parameter of an oscillating system generally describes how fast the oscillation decays to a low energy state through viscous forces. The magnetic damping parameter described herein is treated as a phenomenological constant describing the gradual rotation of magnetic moment into alignment with effective field. The higher the damping constant, the faster the magnetic alignment occurs. Other properties of this cap layer include high saturation magnetization (Ms) (e.g., higher than 300 emu/cc at 700K), high optical absorption (e.g., having nk≥5, where n is refractive index and k is extinction coefficient), and good exchange coupling to the underlying FePtX granular layer (e.g., greater than 10% of exchange strength in bulk Fe).

A rare earth doped Co alloy capping layer, including one or more of Fe and Pt, as described herein, comprises an amorphising agent. The amorphising agent comprises one or more elements selected from a group comprising B, Zr, Ta, Cr, Nb, W, V, and Mo. For example, the capping layer could include two or three of the amorphising elements. The rare earth doping material comprises at least one element from a group comprising Ho, Tb, Gd, Nd, Sm, Dy, Pr, Er, and Tm. The composition of the amorphous capping layer materials is selected in order to achieve a Curie temperature greater than about 500 C and saturation magnetization of greater than about 600 emu/cc. In certain embodiments, the rare earth doping level is greater than about 2% such that the damping parameter can be increased above 0.1. In various embodiments, a rare earth doped amorphous capping layer can be either continuous or semicontinuous.

A semicontinuous capping layer can be achieved by introducing segregant and/or grain boundary materials such as boron or oxides, and a continuous layer lacks such grain boundary materials. In HAMR magnetic recording, materials like $FePtC(BN)(SiO_2)$ generally have crystalline metallic magnetic grain cores separated by amorphous non-magnetic grain boundaries. These would be discontinuous magnetic grains. In contrast, FeCo generally forms connected, continuous, metallic, exchange coupled magnetic grains. Addition of non-magnetic materials such as B, Zr, Ta, Cr, Nb, W, V, and Mo to, for example, FeCo affect the magnetic and microstructural properties of the continuous material. For example, Cr segregates to grain boundaries when deposited at high temperature so that the material remains crystalline and metallic, but the high concentration of non-magnetic material at the grain boundaries makes the magnetic grain cores become increasingly separated or discontinuous (only semi-continuous). Other elements, such as Ta and Zr are larger than Fe and Co but mostly remain in the core without segregating. These types of elements stretch and strain the lattice causing crystal defects, smaller grain size, and eventually, a non-crystalline (amorphous) structure.

Figure 3:
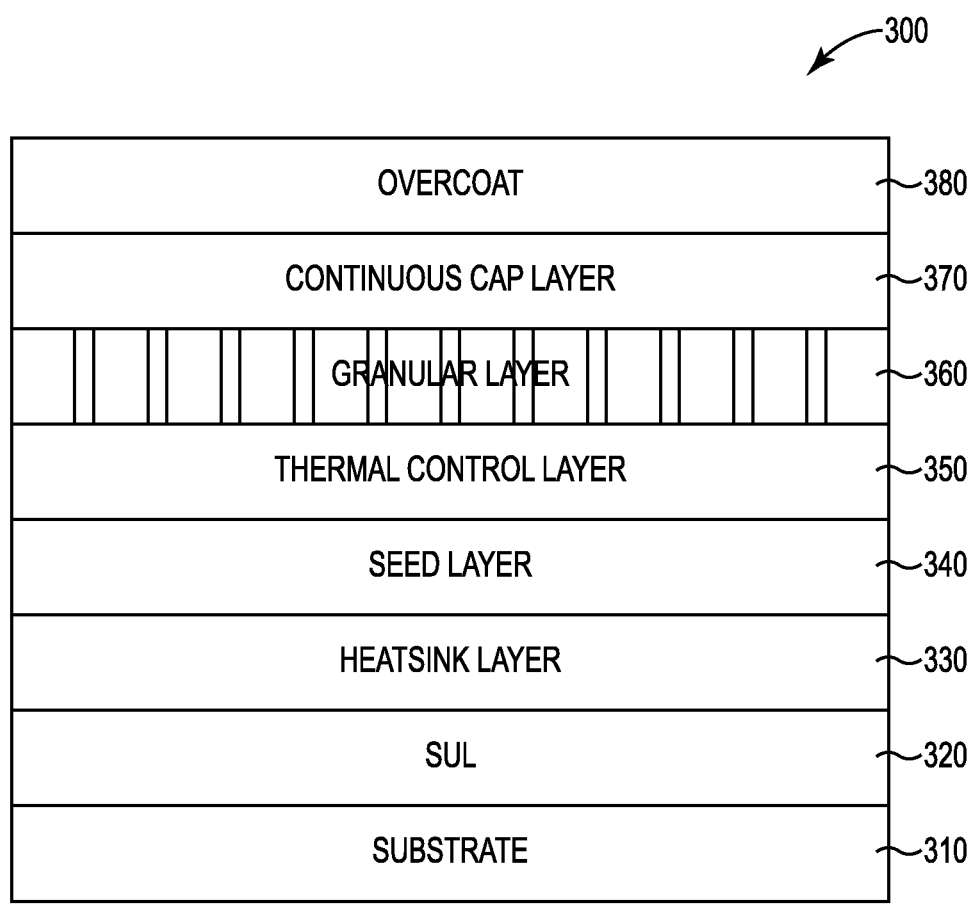
FIG. 3 is a cross-sectional diagram of a magnetic stack in accordance with embodiments discussed herein.
Figure 4:
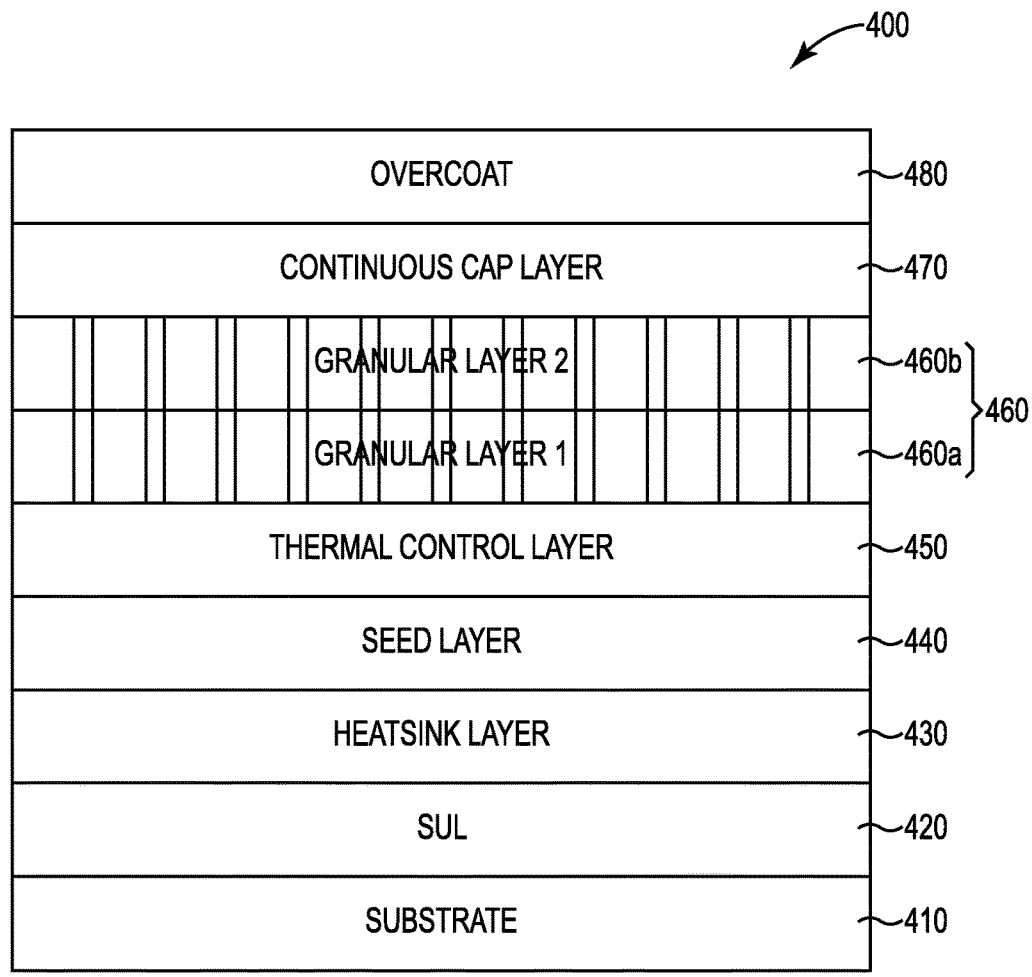
FIG. 4 is a cross-sectional diagram of a magnetic stack in accordance with embodiments discussed herein.
Figure 5:
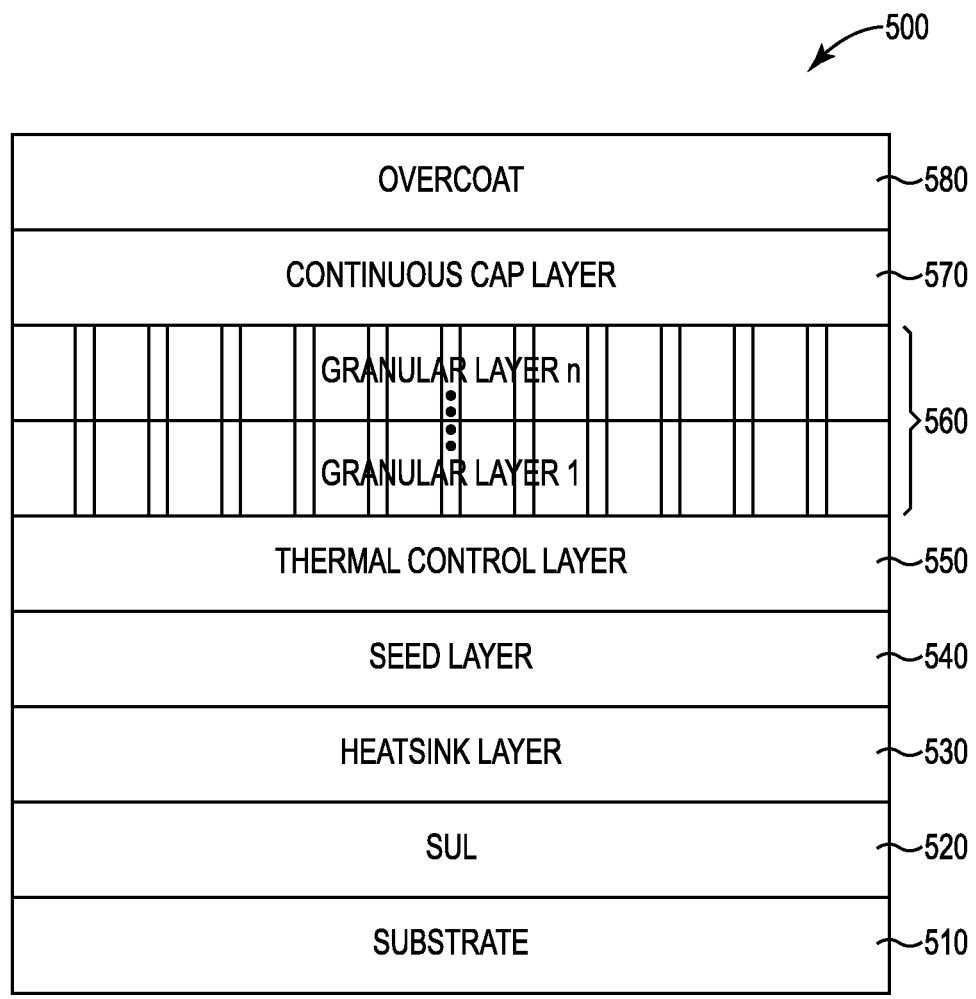
FIG. 5 is a cross-sectional diagram of a magnetic stack in accordance with embodiments discussed herein.

In addition to the magnetic storage layer and the capping layer, a stack can include various additional layers. FIGS. 3-5 illustrate respective cross-sections of HAMR media structures including additional layers. FIG. 3 shows a layer structure, or stack 300, of HAMR recording media including a capping layer 370 comprising Co, one or more of Fe and Pt, at least one rare earth element, and at least one amorphising agent from a group comprising B, Zr, Ta, Cr, Nb, W, V, and Mo that provides damping and thermal control for the underlying recording layer. The stack 300 includes a substrate 310, a soft underlayer 320, a heatsink layer 330, a seed layer 340, and a thermal control layer 350. Each of these layers underlying the granular recording layer 360 can comprise one or more layers. In certain embodiments, one or more of the underlying layers may serve multiple functions, e.g., a single layer could provide both thermal control and growth orientation (a seed layer). The underlayers are selected for establishing proper crystal growth, microstructure control, as well as thermal property design. The amorphous capping layer 370 is disposed on the granular storage layer 360 and a protective overcoat or lubricant layer 380 is disposed on the top of the stack 300. In FIG. 3 the magnetic recording layer is shown as a single granular two-phase layer, for example, comprising FePtX, where X is a generic representation of a segregant such as oxides, carbides, nitrides, or any of these in combination with carbon, disposed between grains. However, the recording layer 360 can comprise a variety of structures, discussed further below.

FIG. 4 also shows a layer structure, or stack 400, of HAMR recording media including a capping layer 470 comprising Co, one or more of Fe and Pt, at least one rare earth element, and at least one amorphising agent from a group comprising B, Zr, Ta, Cr, Nb, W, V, and Mo that provides damping and thermal control for the underlying recording layer. However, in FIG. 4, the recording layer is a structure involving dual granular two-phase recording layers 460a, 460b. The stack 400 includes a substrate 410, a soft underlayer 420, a heatsink layer 430, a seed layer 440, and a thermal control layer 450. Each of these layers underlying the granular recording layers 460a, 460b can comprise one or more layers. In certain embodiments, one or more of the underlying layers may serve multiple functions, e.g., a single layer could provide both thermal control and growth orientation (a seed layer). The underlayers are selected for establishing proper crystal growth, microstructure control, as well as thermal property design. The amorphous capping layer 470 is disposed on the bi-layer recording structure 460a, 460b and a protective overcoat or lubricant layer 480 is disposed on the top of the stack 400.

In FIG. 4 the magnetic recording layer is shown as a dual, or hi-, layer where each layer is a granular two-phase layer, for example, comprising FePtX, where X is a generic representation of a segregant disposed between grains. The grains of the respective layers 460a and 460b are in substantial vertical alignment such that the respective segregants are also approximately vertically aligned. Recording layer 460b can comprise the same materials as layer 360 discussed above, and layer 460a can also comprise the same materials, or different materials. Using different material for the two sublayers provides increased control over the total material properties of the recording layer 460. For example, using a low-$H_k$/high-$H_k$ hi-layer structure, the exchange-coupled-composite effect lowers switching field without affecting thermal stability.

FIG. 5 also shows a layer structure, or stack 500, of HAMR recording media including a capping layer 570 Co, one or more of Fe and Pt, at least one rare earth element, and at least one amorphising agent from a group comprising B, Zr, Ta, Cr, Nb, W, V, and Mo that provides damping and thermal control for the underlying recording layer. However, in FIG. 5, the recording layer 560 is a structure involving multiple granular two-phase recording layers (n layers). The stack 500 includes a substrate 510, a soft underlayer 520, a heatsink layer 530, a seed layer 540, and a thermal control layer 550. Each of these layers underlying the granular recording layer 560 can comprise one or more layers. In certain embodiments, one or more of the underlying layers may serve multiple functions, e.g., a single layer could provide both thermal control and growth orientation (a seed layer). The underlayers are selected for establishing proper crystal growth, microstructure control, as well as thermal property design. The amorphous capping layer 570 is disposed on the multi-layer recording structure 560 and a protective overcoat or lubricant layer 580 is disposed on the top of the stack 500.

In FIG. 5 the magnetic recording layer is shown as a multi-layer structure where each layer is a granular two-phase layer, for example, comprising FePtX, where X is a generic representation of a segregant disposed between grains. The grains of the respective layers 1 through n are in substantial vertical alignment such that the respective segregants are also substantially vertically aligned. The $n^{th}$ layer, shown adjacent the amorphous capping layer 570 can comprise the same materials as layer 360 discussed above, and the underlying recording layers (1 through n−1) can also comprise the same materials, or different materials. Using different materials for one or more sublayers can provide better control over the total material properties of the recording layer 560. For example, using one or more low-$H_k$/high-$H_k$ bi-layer structures, the exchange-coupled-composite effect lowers switching field without affecting thermal stability.

Figure 6:
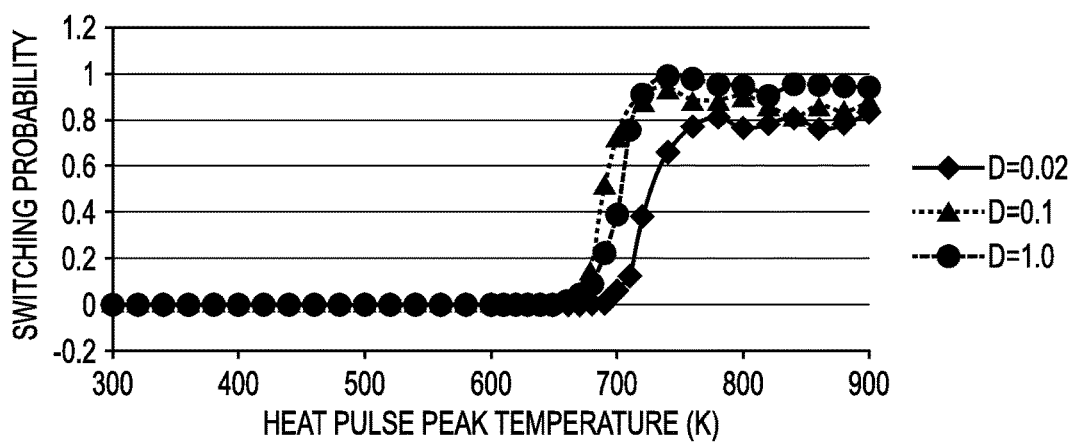
FIG. 6 is a graph showing the effect on switching probability with increasing heat pulse peak temperature for single granular layer media in accordance with embodiments discussed herein.

Turning to FIG. 6, the modeled effect of damping on a single layer granular recording structure is shown. The switching probability of the recording layer after experiencing heat pulses with varying peak temperature, is estimated from an atomistic model using a stochastic Landau-Lifshitz-Bloch (LLB) equation. The LLB approach is used instead of the conventional Landau-Lifshitz-Gilbert (LLG) dynamics because it provides a more realistic description of magnetodynamics at elevated temperature by capturing the torque and fluctuations in the longitudinal direction. The applied reversal magnetic field is set to 1 Tesla during both the heating and cooling periods. In FIG. 6, the damping constant of the granular layer is varied (0.02, 0.1, and 1), and the heat pulse duration is set at 20 ps. As can be seen, a higher damping parameter, in general, leads to a sharper transition and lower DC noise.

Figure 7:
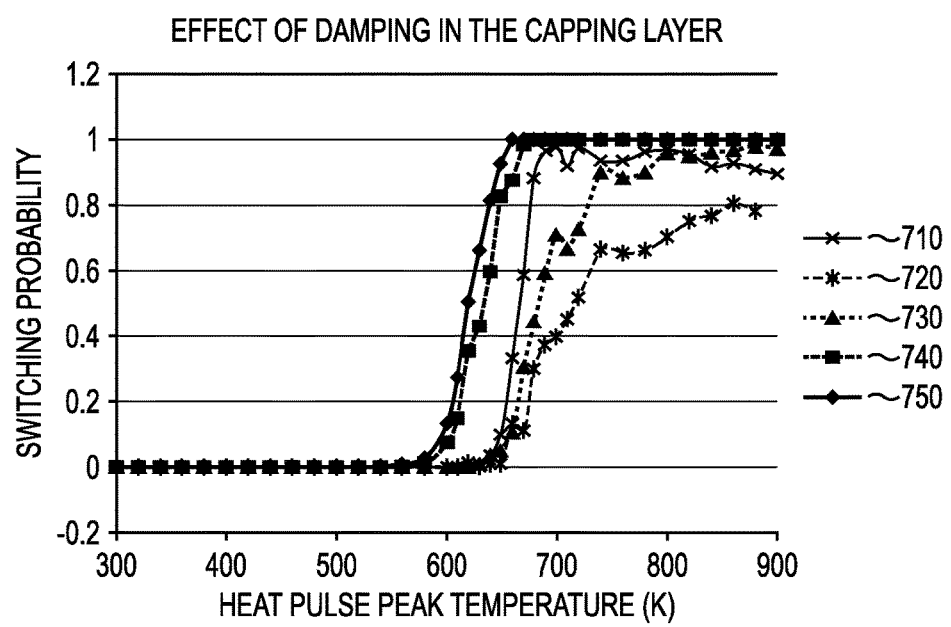
FIG. 7 is a graph showing the effect on switching probability with increasing heat pulse peak temperature for granular layer and amorphous cap layer composite media in accordance with embodiments discussed herein.

FIG. 7 shows the effect of increased damping in the capping layer of a granular recording layer and capping layer bi-layer composite media structure. The capping layer comprises Co, one or more of Fe and Pt, at least one rare earth element, and at least one amorphising agent from a group comprising B, Zr, Ta, Cr, Nb, W, V, and Mo. In the figure, results for a media structure having a single recording layer, similar to the structure modeled in FIG. 6, and having a damping constant of 0.05 is labeled as 710. In addition, results for various composite media structures having a granular recording layer and an amorphous capping layer, e.g., a recording structure similar to that shown in the stack of FIG. 3, and differing damping parameters for the respective capping layers are labeled as 720 (damping parameter 0.05), 730 (damping parameter 0.1), 740 (damping parameter 0.5), and 750 (damping parameter 1.0). Rare earth doping can enhance damping in the capping layer, which is a material property for a capping layer. Compared to a structure with a single granular recording layer (e.g., 710), the bi-layer, or composite, recording layer media structures exhibit lower DC noise with comparably sharp transitions—as long as the damping parameter is controlled to be high (e.g., >0.1). This is shown with the results labeled 740 and 750. Also the recording temperature is reduced by about 50 Kelvin for the structures represented by 740 and 750. For this example, the damping constant of the granular storage structure (FePtX) is 0.05, the heat pulse duration is 100 ps; and the reversing field is 1 Tesla.

In view of FIGS. 6 and 7, it can be seen that when the damping constant is below about 0.1 the switching properties of the material degrade. Since granular FePt hard magnetic layers naturally have damping in this range, they may be used for HAMR recording layers. However, as discussed above, it is desirable to improve recording performance while reducing media roughness using a capping layer. Since soft Co alloys, such as FeCo, by themselves naturally have damping constants below 0.05, the low damping constant prevents use of these alloys alone in a capping layer to reduce roughness, improve the freezing process, etc. However, by increasing the damping constant of a Co alloy capping layer toward 0.1, rapid and unexpected improvement in switching of the media structure results, even with a marginal FePt layer damping constant of 0.05. One way to increase the damping constant of the capping layer is to introduce one or more rare earth elements to the Co-based capping layer.

Figure 8:
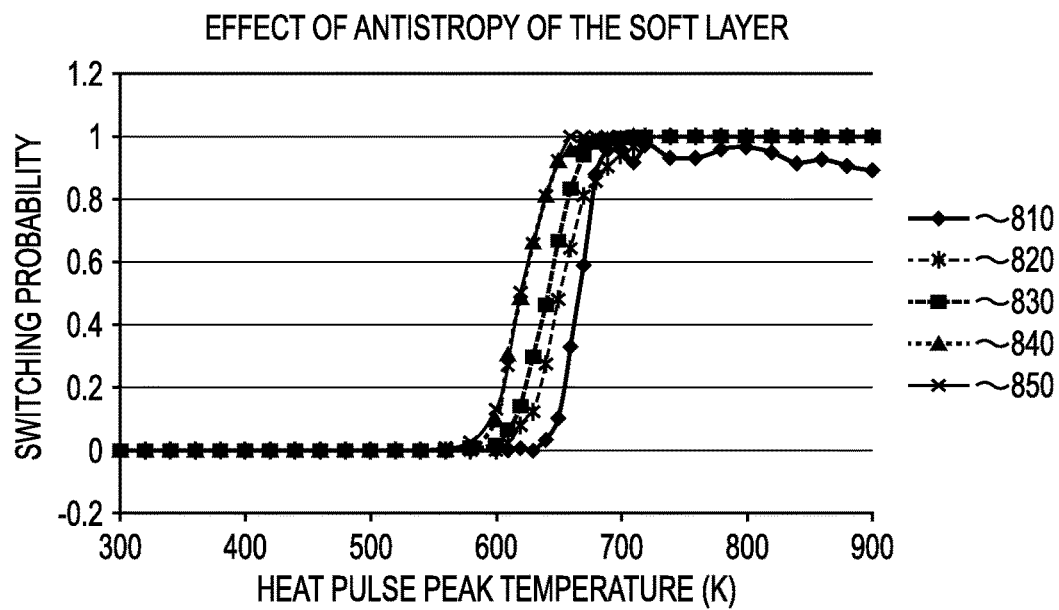
FIG. 8 is a graph showing the effect on switching probability with increasing heat pulse peak temperature for granular layer and amorphous cap layer composite media while varying anisotropy in the cap layer in accordance with embodiments discussed herein.

Since the capping layer is amorphous, it generally has little to no anisotropy. FIG. 8 shows the modeled effect of the capping layer anisotropy on the switching probability of the recording structure. In the figure, results for a media structure having a single recording layer, similar to the structure modeled in FIG. 6, is labeled as 810. In addition, results for various composite media structures having a granular recording layer and an amorphous capping layer, e.g., a recording structure similar to that shown in the stack of FIG. 3, and having differing anisotropies for the respective capping layers are labeled as 820 (Hk of 2.8 T), 830 (Hk of 1.4 T), 840 (Hk of 0.14 T), and 850 (Hk of 0.0114 T). The damping constant of the capping layer is 1.0, while the damping constant of the granular recording structure (FePtX) is 0.05. The heat pulse duration is 100 ps, and the reversing field is 1 Tesla. It can be seen that switching temperature decreases with decreasing anisotropy, while transition sharpness has little dependence on the anisotropy of the capping layer.

Figure 9:
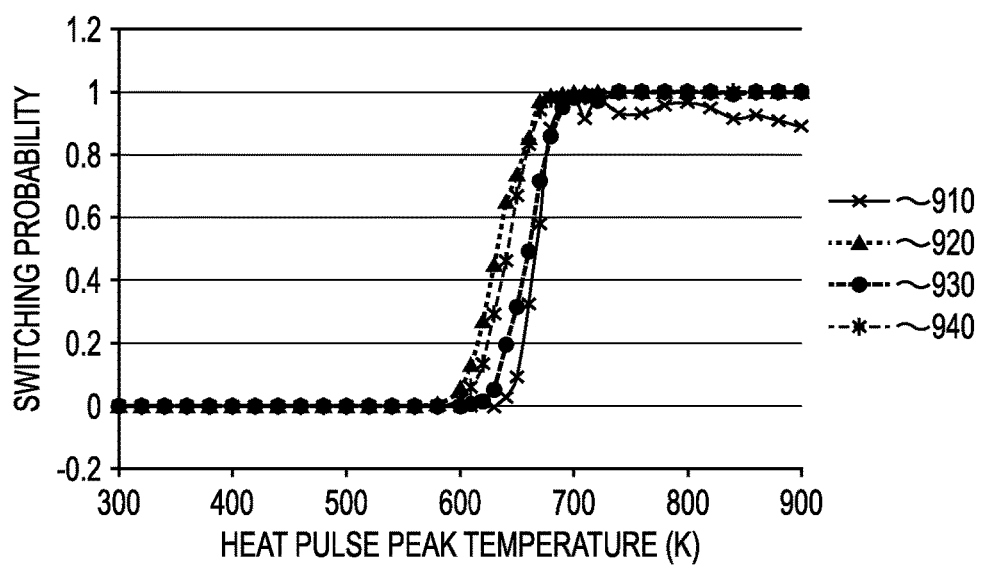
FIG. 9 is a graph showing the effect on switching probability with increasing heat pulse peak temperature for granular layer and amorphous cap layer composite media while varying Ms in the cap layer in accordance with embodiments discussed herein.

FIG. 9 shows the effect of capping layer saturation magnetization (Ms) and capping-recording structure exchange coupling strength on the switching probability of a granular recording layer and capping layer hi-layer composite media structure where the amorphous capping layer comprises Co, one or more of Fe and Pt, at least one rare earth element, and at least one amorphising agent from a group comprising B, Zr, Ta, Cr, Nb, W, V, and Mo. In the figure, results for a media structure having a single recording layer, similar to the structure modeled in FIG. 6, is labeled as 910. In addition, results for various composite media structures having a granular recording layer and an amorphous capping layer, e.g., a recording structure similar to that shown in the stack of FIG. 3, and having differing saturation magnetization for the respective capping layers and differing capping-recording layer exchange coupling strengths are labeled as 920 (high Ms and weak coupling), 930 (low Ms and strong coupling), and 940 (high Ms and strong coupling). High Ms refers to at least 2.2 muB/atom, and low Ms refers to about 1.5 muB/atom. Strong coupling refers to about FePt bulk value and weak coupling refers to about half the bulk value. To obtain the results, heat pulse duration is 100 ps, and the reversing field is 1 Tesla. In general, it can be seen that higher saturation magnetization results in a bigger Zeeman splitting and a lower DC noise. Higher saturation magnetization also facilitates lower switching temperature. Amorphous capping layer materials, as described herein, have one of the highest Ms values among existing materials; therefore, it is a useful material system for the capping layer.

Certain embodiments have enough exchange coupling between the capping layer and the recording structure. Preferably, exchange coupling strength is higher than ten percent of the exchange coupling strength in bulk iron. Exchange coupling allows the reversed spin moments in the capping layer to assist switching and then hold the spin moments of the recording structure. From FIG. 9, it can be seen that weak or moderate coupling results in a bigger Zeeman splitting, a lower DC noise, and lower switching temperature (e.g., 920) using the amorphous, rare earth doped capping layer with an FePtX based recording layer. This level of exchange coupling can be achieved by controlling the interface between the capping layer and the adjacent recording layer either via reduced sputtering temperature for the capping layer; or by using bias/etching to ensure sufficient coupling between the capping layer and the granular recording layer upon which it is disposed.

Figure 10:
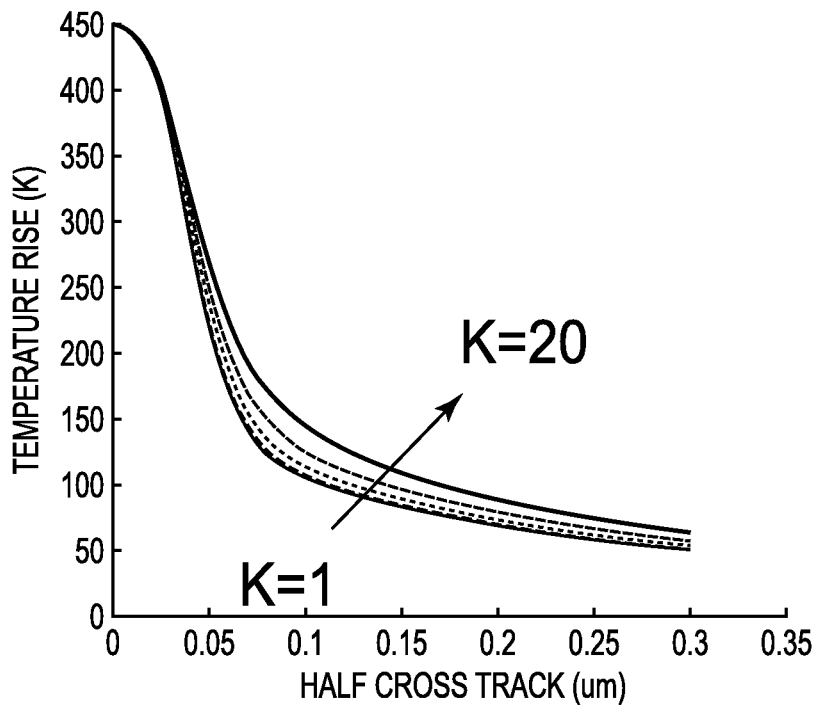
FIGS. 10-11 are graphs showing the effect of lateral thermal conductivity in the cap layer on thermal gradient and on on- and cross-track recording performance in accordance with embodiments discussed herein.
Figure 11:
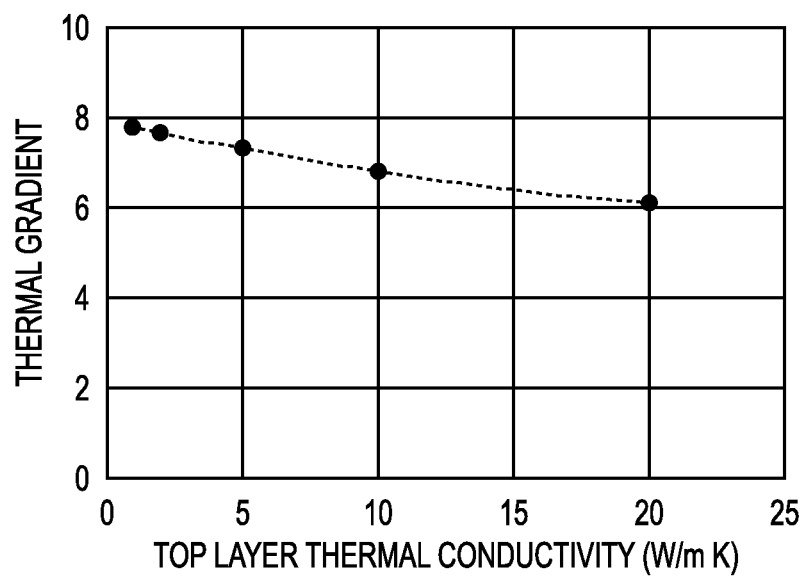

One challenge in designing capping layers for media used with HAMR is thermal broadening. Continuous crystalline metallic layers, having no phase segregant or grain boundary materials, usually have a much larger lateral thermal conductivity as compared with granular layers where the crystalline grains are laterally thermally decoupled with low thermal conductivity amorphous materials such as oxide, nitride, or carbon as segregant. This thermal broadening; or bloom, can lead to increased thermal side-track erasures and poor transition sharpness. FIGS. 10 and 11 show thermal modeling data illustrating the effect of top layer thermal conductivity on the cross track temperature rises.

FIG. 10 shows the temperature rise in the media with increasing distance from the center of the laser spot. The thermal conductivity; K, is measured in W/m*K (watts per meter kelvin). High thermal conductivity 20 W/m*K) in the capping layer produces a broader temperature profile corresponding to increased thermal bloom. FIG. 11 shows that the broader thermal profile produces a lower thermal gradient in the media with a 20 W/m*K thermal conductivity. Thus, a higher lateral thermal conductivity in the capping layer results in a loss of thermal gradient, thereby deteriorating both on-track and cross-track recording performances. The effect is very large in the case of highly crystalline capping layers having thermal conductivity in the range of 10-100 W/m*K. An amorphous capping layer comprising materials as described in various embodiments herein has a relatively low thermal conductivity (1-4 W/(m*K)). This is an order of magnitude lower than that of continuous crystalline layers, as shown in FIG. 11, Therefore thermal broadening can be alleviated with an amorphous capping layer comprising Co, one or more of Fe and Pt; at least one rare earth element; and at least one amorphising agent from a group comprising B, Zr, Ta, Cr, Nb, W, V, and Mo, in contrast to a crystalline cap layer. The thermal conductivity can be further lowered by doping and/or ion implantation. These features can be implemented via methods of forming a capping layer.

An amorphous capping layer as described herein is formed by sputter depositing the constituent materials on an FePtX magnetic recording layer to achieve a desired roughness, microstructure, magnetic and thermal properties while tuning the exchange coupling between the recording and capping layers. The magnetic recording layer is formed over a substrate, and optionally, one or more layers, e.g., SUL, heatsink, adhesion, seed, and thermal control layers, are formed between the substrate and the magnetic recording layer. In some embodiments the sputter deposition process for the capping layer is similar to that for the magnetic recording layer including a composite target sputtered in an argon environment of 2-100 mT. In alternative embodiments, a nanocrystal design for the capping layer comprises fewer amorphising elements, more Cr and Pt, more Co, and less Fe. The nanocrystal layer is heated to segregate Cr and produce anisotropy along with moderately low thermal conductivity.

In summary, a media structure comprising a L10-FePt-based granular recording layer, or layered structure, includes a damping controlled amorphous capping layer comprising Co, one or more of Fe and Pt, at least one rare earth element, and an amorphising agent comprising one or more of B, Zr, Ta, Cr, Nb, W, V, and Mo. The amorphous capping layer has a smoother surface and lower thermal conductivity than a crystalline capping layer, higher Curie temperature than the FePt based recording structure, and an enhanced damping constant (e.g., 0.1-1) due to the rare-earth doping. Amorphous Co based capping layers, as described in various embodiments herein also include high saturation magnetization, high optical absorption, and good exchange coupling to the underlying granular recording layer. Media structures comprising such capping layers improve HAIR media performance as evidenced by media roughness reduction and lower DC noise.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A stack comprising:
a substrate;
a magnetic recording layer comprising FePtX disposed over the substrate; and
an amorphous capping layer disposed on the magnetic recording layer, the capping layer comprising Co, at least one rare earth element, one or more elements selected from a group consisting of Fe and Pt, and an amorphising agent comprising one to three elements selected from a group consisting of B, Zr, Ta, Cr, Nb, W, V, and Mo.

2. The stack of claim 1, wherein the magnetic recording layer has a Curie temperature and the capping layer has a Curie temperature at least 50K greater than the Curie temperature of the magnetic recording layer.

3. The stack of claim 1, wherein the amorphising agent comprises at least two elements selected from a group consisting of B, Zr, Ta, and Cr.

4. The stack of claim 1, wherein the capping layer has a damping parameter greater than 0.05.

5. The stack of claim 1, wherein the capping layer has thermal conductivity less than 10 W/m*K.

6. The stack of claim 1, wherein the amorphous capping layer has a saturation magnetization of at least 2.2 muB/atom.

7. The stack of claim 1, wherein the capping layer has a roughness of about 0.2 nm.

8. The stack of claim 1, wherein the stack has a switching temperature of 600K or less.

9. The stack of claim 1, wherein the capping layer has a Curie temperature greater than about 500 C and a saturation magnetization of greater than about 600 emu/cc.

10. A stack comprising:
a substrate;
a magnetic recording layer comprising FePtX disposed over the substrate and having a Curie temperature; and
an amorphous capping layer disposed on the magnetic recording layer, the capping layer comprising Co, at least one amorphising agent, at least one rare earth element, and one or more elements selected from a group consisting of Fe and Pt, wherein the capping layer has a Curie temperature at least 50K greater than the Curie temperature of the magnetic recording layer.

11. The stack of claim 10, wherein the amorphising agent comprises at least one element selected from a group comprising B, Zr, Ta, Cr, Nb, W, V, and Mo, and the amorphous capping layer has a saturation magnetization of at least 2.2 muB/atom.

12. The stack of claim 10, wherein the amorphising agent comprises at least two elements selected from a group consisting of B, Zr, Ta, and Cr.

13. The stack of claim 10, wherein the at least one rare earth element is selected from a group comprising Ho, Tb, Gd, Nd, Sm, Dy, Pr, Er, and Tm.

14. The stack of claim 13, wherein the at least one rare earth element is configured to provide the capping layer with a damping constant greater than 0.05.

15. A stack comprising:
a substrate;
a magnetic recording layer comprising FePtX disposed over the substrate; and
an amorphous capping layer having a damping parameter greater than 0.05 disposed on the magnetic recording layer, the capping layer comprising Co, an amorphising agent, at least one rare earth element, and one or more elements selected from a group consisting of Fe and Pt.

16. The stack of claim 15, wherein the magnetic recording layer has a Curie temperature and the amorphous capping layer has a Curie temperature at least 50K greater than the Curie temperature of the magnetic recording layer, and the amorphous capping layer has a saturation magnetization of at least 2.2 muB/atom.

17. The stack of claim 16, wherein the amorphising agent includes at least one element selected from a group comprising B, Zr, Ta, Cr, Nb, W, V, and Mo.

18. The stack of claim 15, wherein the at least one rare earth element is selected from a group comprising Ho, Tb, Gd, Nd, Sm, Dy, Pr, Er, and Tm.

19. The stack of claim 15, wherein the capping layer has a damping parameter greater than 0.10.

20. The stack of claim 15, wherein the capping layer has thermal conductivity less than 10 W/m*K.

* * * * *